United States Patent
Breen

[19]

[11] Patent Number: 6,066,065
[45] Date of Patent: May 23, 2000

[54] COMPOUNDER ASSEMBLY FOR AUTOMATIC TRANSMISSION

[75] Inventor: Timothy W. Breen, East Syracuse, N.Y.

[73] Assignee: New Venture Gear, Inc., Troy, Mich.

[21] Appl. No.: 09/305,791

[22] Filed: May 4, 1999

[51] Int. Cl.[7] ................................................ F16H 3/44
[52] U.S. Cl. ........................ 475/312; 475/311; 475/299; 192/12 R
[58] Field of Search .................... 475/311, 312, 475/299, 126; 192/12 BA, 18 A, 12 R

[56] References Cited

U.S. PATENT DOCUMENTS

| | | | |
|---|---|---|---|
| 4,484,494 | 11/1984 | Sakakibara | 74/781 R |
| 4,567,788 | 2/1986 | Miller | 74/789 |
| 4,649,771 | 3/1987 | Atkinson et al. | 74/781 R |
| 4,798,103 | 1/1989 | Eastman et al. | 74/740 |
| 4,976,671 | 12/1990 | Andersson | 475/299 |
| 5,129,871 | 7/1992 | Sandel et al. | 475/297 |
| 5,588,928 | 12/1996 | Koivunen | 475/126 |

*Primary Examiner*—Charles A Marmor
*Assistant Examiner*—Tisha D. Waddell
*Attorney, Agent, or Firm*—Harness, Dickey & Pierce, P.L.C.

[57] ABSTRACT

A transmission compounder assembly comprising an input shaft, an output shaft and a one-way clutch operable to establish a direct-ratio drive path between the shafts. A planetary gearset can be selectively engaged to establish a compound-ratio drive path between the shafts. The planetary gearset includes a sun gear, a ring gear fixed to the output shaft, a carrier fixed to the input shaft, and a plurality of planet gears rotatably supported from the carrier and meshed with both the ring gear and the sun gear. A band brake is provided for selectively braking the sun gear. A clutch pack is mounted between the carrier and the sun gear and can be selectively actuated to prevent relative rotation therebetween. The compounder assembly further includes a brake actuator for controlling actuation of the band brake and a clutch actuator for controlling actuation of the clutch pack. The compounder assembly is operable in a direct drive mode wherein the band brake is released and the clutch pack is engaged to couple the sun gear for common rotation with the carrier. As such, the one-way clutch functions to transfer rotary power from the input shaft to the output shaft while the clutch pack absorbs any reverse relative rotation. In addition, an overdrive mode is established by releasing the clutch pack and engaging the band brake such that the sun gear is braked and the ring gear drives the output shaft at a non-direct speed relative to the input shaft.

14 Claims, 2 Drawing Sheets

COMPOUNDER ASSEMBLY FOR AUTOMATIC TRANSMISSION

FIELD OF THE INVENTION

The present invention relates to automatic multi-speed transmissions for use in motor vehicles and, more particularly, to a compounder assembly that is adapted to provide a compounded drive ratio to an existing automatic transmission.

BACKGROUND OF THE INVENTION

Motor vehicle transmissions commonly employ an add-on "overdrive" gearbox to provide an additional gear ratio. Some applications use this overdrive gearbox to "compound" the ratio of additional gears. Typically, such "compounders" include a planetary gearset and one or more clutches that can be selectively actuated to establish one of a direct-drive mode and an overdrive mode. As is known, the direct drive mode provides a one-to-one gear ratio which enables the compounder to, in effect, be by-passed by the transmission. On the other hand, the overdrive mode provides a gear ratio other than one-to-one which provides the transmission with a simple and relatively inexpensive additional drive gear.

In many compounders, the input shaft and the output shaft are coaxially disposed in a housing. A direct drive device is employed to directly interconnect the input shaft to the output shaft so as to establish the direct drive mode. Overrunning (i.e., one-way) clutches are typically used for the direct drive device. An overdrive device is similarly employed to interconnect the input shaft to the output shaft so as to establish the overdrive mode. In many instances, the overdrive device includes a planetary gearset and a selectively engageable mode clutch. In particular, the overdrive mode is commonly achieved by actuating the mode clutch to fix a sun gear of the planetary gearset to the housing, whereby an output member of the planetary gearset is driven at an increased speed ratio. Some examples of conventional compounders are disclosed in U.S. Pat. Nos. 4,484,494; 4,567,788; 4,649,771; 4,798,103 and 4,976,671. While such compounders have proven to work satisfactorily for their intended purpose, a need exists to minimize packaging and complexity while concomitantly advancing the state of the art.

SUMMARY OF THE INVENTION

In accordance with the broad teachings of this invention, a compounder assembly is disclosed which is adapted for use in a motor vehicle driveline in association with a transmission to provide at least one additional gear ratio. The compounder assembly comprises a housing having an input shaft and an output shaft rotatably supported therein. A one-way clutch is operable to establish a direct-ratio drive path between the shafts. Alternatively, a planetary gearset can be selectively engaged to establish a compound-ratio drive path between the shafts. The planetary gearset includes a sun gear, a ring gear fixed to the output shaft, a carrier fixed to the input shaft, and a plurality of planet gears rotatably supported from the carrier and meshed with both the ring gear and the sun gear. A band brake is provided for selectively braking the sun gear. A clutch pack is mounted between the carrier and the sun gear and can be selectively actuated to prevent relative rotation therebetween. The compounder assembly further includes a brake actuator for controlling actuation of the band brake and a clutch actuator for controlling actuation of the clutch pack. The compounder assembly is operable in a direct drive mode wherein the band brake is released and the clutch pack is engaged to couple the sun gear for common rotation with the carrier. As such, the one-way clutch functions to transfer rotary power from the input shaft to the output shaft while the clutch pack absorbs any reverse relative rotation. In addition, an overdrive mode is established by releasing the clutch pack and engaging the band brake such that the sun gear is braked and the ring gear drives the output shaft at a non-direct speed relative to the input shaft.

In accordance with one preferred construction, the one-way clutch is installed directly between the input shaft and the output shaft with an inner race element fixed to the input shaft, an outer race element fixed to the output shaft, and a set of locking elements disposed therebetween.

According to an alternative embodiment of the present invention, the one-way clutch is installed between the input and output members of the planetary gearset with the inner race element fixed to the carrier and the outer race element fixed to the ring gear.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
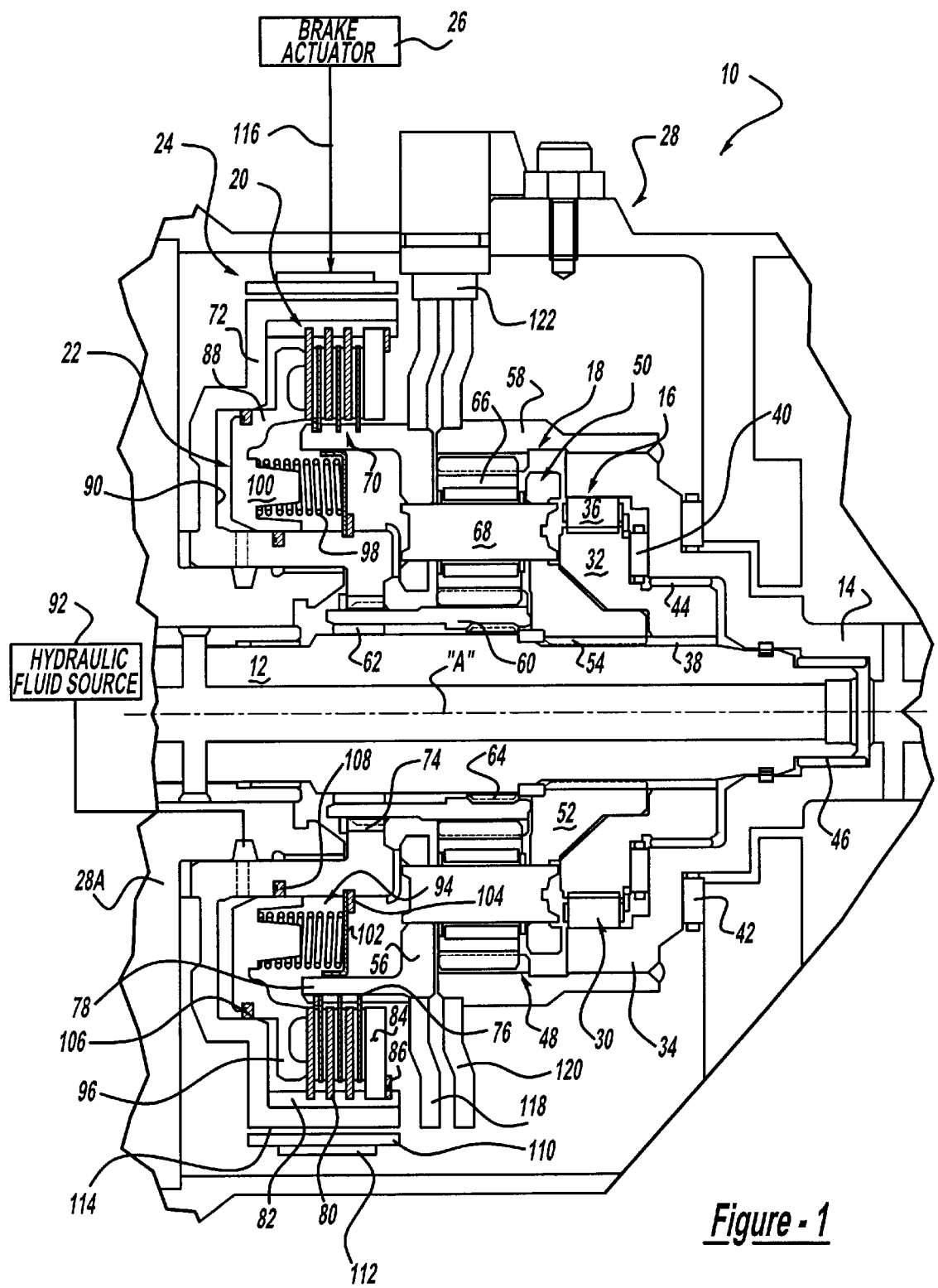
FIG. 1 is a sectional view illustrating a compounder assembly according to a first embodiment of the present invention.

Referring to FIG. 1, an add-on compounder assembly 10 according to a first embodiment of the present invention is illustrated. Compounder assembly 10 is adapted to be used either in conjunction with a conventional automatic transmission of an automotive vehicle or as an integral part of such a transmission. The primary components of compounder assembly 10 include an input shaft 12, and output shaft 14, a direct-drive device 16, an overdrive device 18, a direct clutch 20, a clutch actuator 22, a brake device 24, and a brake actuator 26. Input shaft 12 and output shaft 14 are rotatably supported within a housing 28 and are coaxially aligned such that they rotate about a common longitudinal axis "A". In automotive drivetrain applications where compounder assembly 10 is installed between the torque converter and the transmission, input shaft 12 is driven by the torque converter output shaft while output shaft 14 drives the transmission input shaft. Alternatively, if compounder assembly 10 is installed between the transmission and the driveshaft, then input shaft 12 is driven by the transmission output shaft and output shaft 14 drives the driveshaft. As such, compounder assembly 10 is adapted for installation at and connection to either the input or the output of the transmission to accommodate particular packaging requirements. Preferably, compounder assembly 10 is a pre-assembled unit that is installed in a housing extension or within a chamber provided within housing 28.

With continued reference to FIG. 1, direct-drive device 16 is shown as an overrunning-type or one-way clutch 30 operable for selectively transferring rotary power from input shaft 12 to output shaft 14 for establishing a direct-ratio drive path therebetween. One-way clutch 30 includes an inner race element 32, an outer race element 34, and a plurality of locking elements 36 disposed therebetween. Inner race element 32 is fixed to input shaft 12 at splined connection 38 for rotation therewith. Outer race element 34 is formed integral with, or secured to, output shaft 14 for rotation therewith. Locking elements 36 are arranged to automatically engage locking surfaces on inner race element 32 and/or outer race element 34 when a driving torque is transmitted from input shaft 12 to output shaft 14. However, locking elements 34 are automatically released when a driving torque is transmitted in the opposite direction. As such, input shaft 12 will drive output shaft 14 in a first direction, but output shaft 14 will overrun input shaft 12 in the second direction. Direct drive device 16 further includes an inner thrust bearing assembly 40 positioned between corresponding radial face surfaces on inner race element 32 and outer race element 34, and an outer thrust bearing assembly 42 positioned between corresponding radial face surfaces on outer race element 34 and a wall portion of housing 28. Direct drive device 16 further includes a journal bushing 44 disposed between inner race element 32 and outer race element 34 of one-way clutch 30, and a journal bushing 46 disposed between pilot surfaces on input shaft 12 and output shaft 14.

As noted, compounder assembly 10 includes overdrive device 18 which is operable to selectively interconnect input shaft 12 and output shaft 14 for establishing a compound-ratio drive path therebetween. It should be appreciated that compound-ratio drive path defines a gear ratio other than one-to-one. Overdrive device 18 includes a planetary gearset 48 having an input member driven by input shaft 12, a reaction member, and an output member driving output shaft 14. In this regard, the input member of planetary gearset 48 includes a planet carrier 50 having a first carrier member 52 which is fixed to input shaft 12 at splined connection 54 and which is interconnected to a second carrier member 56. The output member of planetary gearset 48 includes an annulus or ring gear 58 that is integral with, or secured to, outer race element 34 of direct-drive device 16 for rotation with output shaft 14. A sun gear 60 acts as the reaction member of planetary gearset 48 and is rotatably supported on input shaft 12 by a pair of journal bushings 62 and 64. A plurality of planet gears 66 are rotatably supported by planet carrier 50 and are meshed with ring gear 58 and sun gear 60. Specifically, each planet gears 66 is rotatably supported by anti-friction bearings on a pinion shaft 68 which extends between carrier members 52 and 56.

Direct clutch 20 includes a clutch pack 70 which can be selectively actuated by clutch actuator 22 for coupling planet carrier 50 to a brake drum 72. Brake drum 72 is supported for rotation relative to a bulkhead portion 28A of housing 28 and is fixed to sun gear 60 at a splined connection 74 for rotation therewith. Consequently, selective frictional engagement of clutch pack 70 functions to couple planet carrier 50 for rotation with sun gear 60. Clutch pack 70 includes a set of inner clutch plates 76 splined to an externally-splined drum segment 78 of second carrier member 56 and which are alternately interleaved with a set of outer clutch plates 80 splined to an internally-splined drum segment 82 of brake drum 72. A reaction plate 84 is also splined to drum segment 82 of brake drum 72 and a retaining ring 86 retains outer clutch plates 80 and reaction plate 84 thereon.

Clutch actuator 22 includes a piston 88 slidably disposed in a piston chamber 90 formed in brake drum 72, and a hydraulic fluid source 92 that is operable for controlling the flow of fluid into and out of chamber 90 for causing piston 88 to move between a released position and a locked position. Hydraulic fluid source 92 can be associated with the hydraulic controls of the automatic transmission or, alternatively, can be a remote fluid circuit capable of providing high pressure fluid. When fluid is vented from chamber 90, a spring assembly 94 forcibly biases piston 88 to its released position. With piston 88 in its released position, an apply plate segment 96 is retracted with respect to clutch pack 70 and a predetermined minimum clutch engagement force is exerted on clutch pack 70 such that direct clutch 20 is defined to be operating in a "non-actuated" mode. In contrast, delivery of high pressure fluid to chamber 90 causes piston 88 to move to its locked position, in opposition to the biasing of spring assembly 94, whereat apply plate segment 96 exerts a predetermined maximum clutch engagement force on clutch pack 70 such that direct clutch 20 is defined to be operating in an "actuated" mode. Preferably, the magnitude of predetermined minimum clutch engagement force is zero such that clutch pack 70 is fully released. Likewise, the magnitude of the predetermined maximum clutch engagement force is selected such that clutch pack 70 is fully clamped. Spring assembly 94 is shown to include a series of coil springs 98 retained between spring retainer posts 100 on piston 88 and a spring retainer plate 102 mounted by a retainer clip 104 to brake drum 72. Seals 106 and 108 are shown to be disposed between piston 88 on the wall surfaces of chamber 90 to provide a fluidtight seal therebetween.

With continued reference to FIG. 1, brake device 24 is shown to be a band brake which includes a plurality of brake strips 110 of a suitable clutch or brake friction material that are mounted on movable calipers 112 disposed about a circumferential friction surface 114 of brake drum 72. Brake actuator 26 is operable to move calipers 112 for causing brake strips 110 to move into and out of engagement with friction surface 114 to control speed retardation of sun gear 60, thereby also controlling the speed of ring gear 58 and thus the speed at which output shaft 14 is driven. Brake actuator 26 can be any suitable bi-directional power-operated device (i.e., motor-driven linear actuator, hydraulically-actuated servomotor, etc) which, as indicated by leadline 116, controls movement of calipers 112. In accordance with one control strategy, brake actuator 26 is a two state (i.e., on/off) device having means for locating brake strips 110 in one of two positions. In particular, brake strips 110 may be located in a first position disengaged from friction surface 114 to apply a predetermined minimum braking force on brake drum 72, whereby sun gear 60 is permitted to rotate unrestricted relative to housing 16. In contrast, brake strips 110 may be positioned by brake actuator 26 in a second position tightly clamped to friction surface 114 so as to apply a predetermined maximum braking force on brake drum 72 for braking sun gear 60 against rotation. Thus, brake device 24 is operable in a "released" mode when brake actuator 26 moves brake strips 110 to the first position and is further operable in a "braked" mode when brake actuator 26 moves brake strips 110 to the second position. It is further contemplated that actuation of brake actuator 26 could be adjustably modulated to regulate the braking force between its minimum and maximum braking force levels and thereby controllably modulate the speed ratio between input shaft 12 and output shaft 14. An input tone wheel 118 is fixed to planet carrier 50 and an output tone wheel 120 is shown fixed to ring gear 58. A sensor 122, such as a Hall effect or variable reluctance device, provides signals representative of the rotary speed of tone wheels 118 and 120. These speed signals may be utilized by an electronic transmission controller or microprocessor to control and monitor actuation of clutch actuator 22 and brake actuator 26.

When it is desired to operate compounder assembly 10 in a direct-drive mode for driving output shaft 14 at the same speed as input shaft 12, brake device 24 is shifted into its released mode and then direct clutch 20 is shifted into its actuated mode. As such, clutch pack 70 couples sun gear 60 for common rotation with planet carrier 50 while brake device 24 releases sun gear 60 for rotation relative to housing 28 when input shaft 12 is driven. With compounder assembly 10 in its direct-drive mode, power is transmitted through one-way clutch 30 to output shaft 14 and not through clutch pack 70. However, when a coasting condition occurs with compounder assembly 10 in the direct-drive mode, direct clutch 20 acts to absorb the load and prevent relative motion between sun gear 60 and planet carrier 50, thereby maintaining the direct speed ratio.

When it is desired to operate compounder assembly 10 in an overdrive mode, direct clutch 20 is first shifted into its non-actuated mode and then brake device 24 is shifted into its braked mode. As such, sun gear 60 is braked and rotation of input shaft 12 causes power to be transferred through gearset 48 to output shaft 14 in both driving and coasting conditions with output shaft 14 driven at an increased speed ratio.

Figure 2:
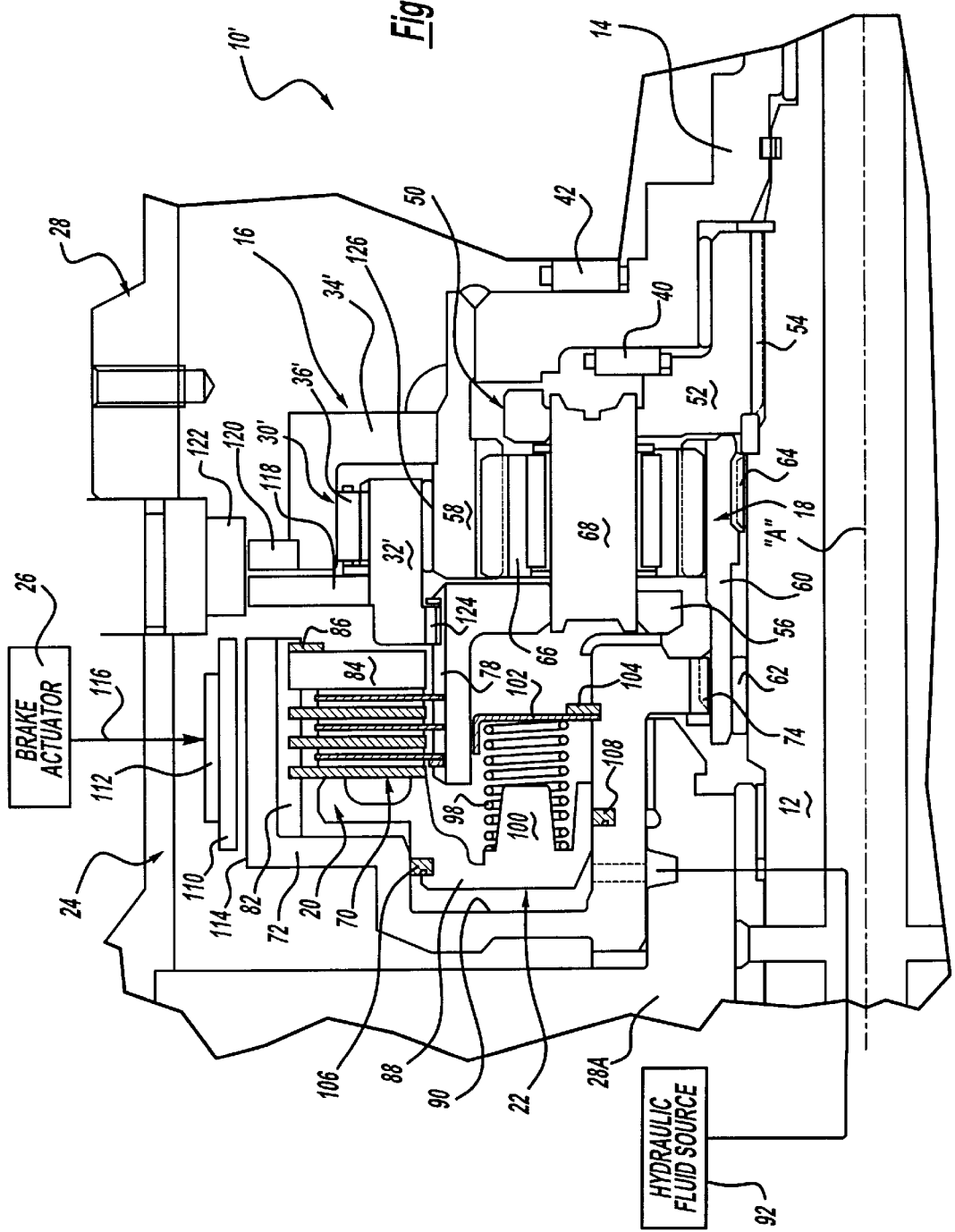
FIG. 2 is a sectional view illustrating the compounder assembly according to a second embodiment of the present invention.

Referring now to FIG. 2, a modified version of a compounder assembly, identified by reference numeral 10', is shown to be generally similar to compounder assembly 10 with the exception that one-way clutch 30' is installed between planet carrier 50 and ring gear 58 instead of directly between input shaft 12 and output shaft 14. As such, a more compact packaging is provided in association with compounder assembly 10'. For purposes of brevity, common reference numerals are used to identify those elements of compounder assembly 10' that are common or similar to those associated with compounder assembly 10.

As seen, one-way clutch 30' includes an inner race element 32' that is fixed to planet carrier 50, an outer race element 34' that is fixed to ring gear 58, and a set of locking elements 36' disposed therebetween. In particular, inner race element 32' is fixed for rotation with second carrier member 56 via a splined connection 124 to drum segment 78. A suitable bushing or bearing assembly 126 rotatably supports inner race element 32' for rotation relative to ring gear 58. Input tone wheel 118 is shown fixed to inner race element 32'. Outer race element 34' is fixed (i.e., welded) to ring gear 58 with output tone wheel 120 fixed thereto.

When it is desired to operate compounder assembly 10' in a direct-drive mode for driving output shaft 14 at the same speed as input shaft 12, brake device 24 is shifted into its released mode and then direct clutch 20 is shifted into its actuated mode. As such, sun gear 60 is free to rotate relative to housing 28 but is frictionally coupled by clutch pack 70 for common rotation with planet carrier 50. Thus, direct rotary power is transferred from input shaft 12 through planet carrier 50 to inner race element 32' for driving outer race element 34' via locking elements 36'. In turn, outer race element 34' drives ring gear 58 and output shaft 14. Any relative rotation between output shaft 14 and input shaft 12 in the opposite direction such as, for example, during a coast condition, will be absorbed by direct clutch 20. Operation of compounder assembly 10' in its overdrive mode is accomplished by shifting direct clutch 20 into its non-actuated mode and then shifting brake device 24 into its braked mode. As such, sun gear 60 is held stationary and rotation of input shaft 12 causes power to be transferred to ring gear 58 which, in turn, drives output shaft 14.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A compounder assembly comprising:
    an input shaft;
    an output shaft;
    a one-way clutch including an input element fixed to said input shaft, an output element fixed to said output shaft, and locking elements disposed between said input and output elements;
    a planetary gearset including a sun gear, a ring gear fixed to said output element, a carrier fixed to said input shaft, and planet gears rotatably supported from said carrier which are meshed with said sun gear and said ring gear;
    a brake drum fixed to said sun gear and having a brake surface;
    a clutch pack mounted between said carrier and said brake drum;
    a band brake disposed about said brake surface;
    a clutch actuator for selectively engaging said clutch pack for coupling said sun gear for common rotation with said carrier; and
    a brake actuator for selectively clamping said band brake on said brake surface for braking rotation of said sun gear.

2. The compounder assembly of claim 1 wherein said brake actuator is operable to move said band brake between first and second positions, said band brake is operable in its first position to release said brake drum and permit rotation of said sun gear, and said band brake is operable in its second position to clamp said brake drum and hold said sun gear against rotation.

3. The compounder assembly of claim 2 wherein said clutch actuator includes a piston that is movable between released and locked positions, said piston is operable in its released position to disengage said clutch pack to permit relative rotation between said carrier and said sun gear, and said piston is operable in its locked position to engage said clutch pack and prevent relative rotation between said carrier and said sun gear.

4. The compounder assembly of claim 3 wherein said piston is disposed in a pressure chamber formed in said brake drum, and wherein said clutch actuator further includes a hydraulic fluid source that is operable to control the supply of hydraulic fluid to said pressure chamber for moving said piston between its locked and released positions.

5. The compounder assembly of claim 4 wherein said clutch actuator further includes a spring assembly for biasing said piston toward its released position.

6. The compounder assembly of claim 3 wherein a direct drive mode is established when said piston is located in its locked position and said band brake is located in its first position, and wherein a non-direct drive mode is established when said piston is located in its released position and said band brake is located in its second position.

7. The compounder assembly of claim 2 wherein said band brake is operable in its first position to apply a predetermined minimum braking force to said brake surface and is operable in its second position to apply a predetermined maximum braking force to said brake surface, and wherein actuation of said brake actuator can be variably controlled to modulate the position of said band brake between its first and second positions for adjustably regulating the braking force applied to said brake drum.

8. A compounder assembly comprising:
   an input shaft;
   an output shaft;
   a planetary gearset including a sun gear, a ring gear fixed to said output shaft, a carrier fixed to said input shaft, and planet gears rotatably supported from said carrier which are meshed with said sun gear and said ring gear;
   a one-way clutch including a drive element fixed to said carrier, a driven element fixed to said ring gear, and locking elements disposed between said drive and driven elements, said one-way clutch operable to transfer rotary power from said drive member to said driven member.
   a brake drum fixed to said sun gear and having a brake surface;
   a clutch pack mounted between said carrier and said brake drum;
   a band brake disposed about said brake surface;
   a clutch actuator for selectively engaging said clutch pack for coupling said sun gear for common rotation with said carrier; and
   a brake actuator for selectively clamping said band brake on said brake surface for braking rotation of said sun gear.

9. The compounder assembly of claim 8 wherein said brake actuator is operable to move said band brake between first and second positions, said band brake is operable in its first position to release said brake drum and permit rotation of said sun gear, and said band brake is operable in its second position to clamp said brake drum and hold said sun gear against rotation.

10. The compounder assembly of claim 9 wherein said clutch actuator includes a piston that is movable between released and locked positions, said piston is operable in its released position to disengage said clutch pack to permit relative rotation between said carrier and said sun gear, and said piston is operable in its locked position to engage said clutch pack and prevent relative rotation between said carrier and said sun gear.

11. The compounder assembly of claim 10 wherein said piston is disposed in a pressure chamber formed in said brake drum, and wherein said clutch actuator further includes a hydraulic fluid source that is operable to control the supply of hydraulic fluid to said pressure chamber for moving said piston between its locked and released positions.

12. The compounder assembly of claim 11 wherein said clutch actuator further includes a spring assembly for biasing said piston toward its released position.

13. The compounder assembly of claim 10 wherein a direct drive mode is established when said piston is located in its locked position and said band brake is located in its first position, and wherein a non-direct drive mode is established when said piston is located in its released position and said band brake is located in its second position.

14. The compounder assembly of claim 9 wherein said band brake is operable in its first position to apply a predetermined minimum braking force to said brake surface and is operable in its second position to apply a predetermined maximum braking force to said brake surface, and wherein actuation of said brake actuator can be variably controlled to modulate the position of said band brake between its first and second positions for adjustably regulating the braking force applied to said brake drum.

* * * * *